United States Patent
Dulac et al.

(10) Patent No.: US 9,979,168 B2
(45) Date of Patent: May 22, 2018

(54) PERFORATION APPARATUS FOR CABLE JACKETS AND RELATED SYSTEMS AND METHODS

(71) Applicant: Rockbestos Surprenant Cable Corp., East Granby, CT (US)

(72) Inventors: Dustin Dulac, Hartford, CT (US); Cliff Westwood, Holyoke, MA (US)

(73) Assignee: ROCKBESTOS SURPRENANT CABLE CORP., East Granby, CT (US)

( * ) Notice: Subject to any disclaimer, the term of this patent is extended or adjusted under 35 U.S.C. 154(b) by 571 days.

(21) Appl. No.: 13/690,230

(22) Filed: Nov. 30, 2012

(65) Prior Publication Data
US 2013/0139393 A1 Jun. 6, 2013

Related U.S. Application Data

(60) Provisional application No. 61/565,760, filed on Dec. 1, 2011.

(51) Int. Cl.
*H02G 1/12* (2006.01)
*B26F 1/36* (2006.01)
*B26B 17/00* (2006.01)

(52) U.S. Cl.
CPC ............ *H02G 1/1209* (2013.01); *H02G 1/12* (2013.01); *B26B 17/006* (2013.01); *Y10T 83/02* (2015.04)

(58) Field of Classification Search
CPC .... B26F 1/36; B26F 2001/365; B26F 17/006; H02G 1/1207; H02G 1/1204; H02G 1/12
USPC ......................................................... 30/363
See application file for complete search history.

(56) References Cited

U.S. PATENT DOCUMENTS

| | | | | |
|---|---|---|---|---|
| 1,096,983 A | * | 5/1914 | aaron | H02G 1/1217 30/90.6 |
| 1,939,574 A | * | 12/1933 | Saylor | H02G 1/1217 30/91.1 |
| 2,830,367 A | * | 4/1958 | Seymour | H02G 1/1229 140/102.5 |
| 3,038,558 A | | 6/1962 | Plummer | |
| 3,237,300 A | * | 3/1966 | Townsend | H02G 1/1229 30/90.6 |
| 3,654,049 A | | 4/1972 | Ausnit | |
| 3,872,590 A | * | 3/1975 | Hill | 30/90.6 |
| 3,906,129 A | | 9/1975 | Damois | |
| 4,083,105 A | * | 4/1978 | Vipond | 30/90.4 |
| 4,162,638 A | * | 7/1979 | McCord | 30/90.1 |
| 4,707,074 A | | 11/1987 | Heywood | |

(Continued)

*Primary Examiner* — Andrea Wellington
*Assistant Examiner* — Fernando Ayala
(74) *Attorney, Agent, or Firm* — Hayes Soloway PC

(57) ABSTRACT

A perforation apparatus for use with cable jackets and related systems and methods thereof is provided. The tool includes a pliers assembly having at least a first jaw member positioned opposing a second jaw member, wherein relative movement of the first and second jaw members is controlled with at least a first handle and a second handle. A first knife edge is on the first jaw member and a second knife edge is on the second jaw member. Each of the first and second knife edges are oriented substantially parallel to one another and substantially perpendicular to a length of first and second handles. The first and second knife edges are movable towards one another. A spacing device is connected to the pliers assembly, wherein the spacing device controls a closing distance between the first knife edge and the second knife edge.

13 Claims, 8 Drawing Sheets

(56) References Cited

U.S. PATENT DOCUMENTS

| | | | |
|---|---|---|---|
| 4,870,878 A * | 10/1989 | Butler | H02G 1/1268 |
| | | | 81/9.51 |
| 5,009,006 A * | 4/1991 | Sawyer et al. | 30/90.6 |
| 5,060,329 A * | 10/1991 | Hudson | H02G 1/1214 |
| | | | 294/99.2 |
| 5,099,889 A | 3/1992 | Ratzlaff | |
| 5,104,701 A | 4/1992 | Cohen et al. | |
| 5,142,950 A * | 9/1992 | Takano | H02G 1/1268 |
| | | | 29/825 |
| 5,377,564 A * | 1/1995 | Erlich | 81/9.44 |
| 5,421,371 A | 6/1995 | Lauer | |
| 5,869,159 A | 2/1999 | Padilla | |
| 5,894,617 A * | 4/1999 | Liou | 7/107 |
| 5,964,252 A | 10/1999 | Simmons et al. | |
| 6,023,844 A * | 2/2000 | Hinson, II | G02B 6/4497 |
| | | | 30/90.4 |
| 6,315,759 B1 | 11/2001 | Peterson | |
| 6,341,626 B1 | 1/2002 | Davenport et al. | |
| 6,351,589 B1 | 2/2002 | Leggett | |
| 6,502,310 B1 * | 1/2003 | Shaw | 30/90.4 |
| 6,545,222 B2 | 4/2003 | Yokokawa et al. | |
| 7,032,479 B1 * | 4/2006 | Wang | B25B 7/02 |
| | | | 29/229 |
| 7,050,685 B2 | 5/2006 | Plemmons et al. | |
| 7,159,620 B2 | 1/2007 | Kissell | |
| 7,438,964 B2 | 10/2008 | Clark | |
| 2003/0095763 A1 | 5/2003 | Dallas et al. | |
| 2003/0118295 A1 | 6/2003 | Lail et al. | |
| 2009/0114418 A1 | 5/2009 | Smith et al. | |
| 2009/0199682 A1 * | 8/2009 | Hanning et al. | 81/9.43 |
| 2011/0167642 A1 * | 7/2011 | Steele et al. | 30/90.1 |
| 2012/0011970 A1 * | 1/2012 | Chen | B25B 7/08 |
| | | | 81/427 |
| 2012/0063731 A1 * | 3/2012 | Fitz et al. | 385/104 |

* cited by examiner

200

---

The cable jacket of the cable is contacted with a first jaw member and second jaw member of a perforation apparatus, wherein at least a portion of the cable jacket is positioned between the first and second jaw members —— 202

A distance between the first and second jaw members is closed, thereby positioning a first knife edge on the first jaw member and a second knife edge on the second jaw member at least partially within the cable jacket to form at least two perforation segments, wherein each of the first and second knife edges are oriented substantially perpendicular to an elongated length of the perforation apparatus, and wherein each of the first and second knife edges are oriented substantially parallel to an elongated length of the cable —— 204

FIG. 8

PERFORATION APPARATUS FOR CABLE JACKETS AND RELATED SYSTEMS AND METHODS

CROSS REFERENCE TO RELATED APPLICATION

This application claims benefit of U.S. Provisional Application Ser. No. 61/565,760, entitled, "Perforation Tool For Cable Jackets" filed Dec. 1, 2011, the entire disclosure of which is incorporated herein by reference.

FIELD OF THE DISCLOSURE

The present disclosure is generally related to cable jackets and more particularly is related to a perforation apparatus for cable jackets and related systems and methods.

BACKGROUND OF THE DISCLOSURE

Elongated cables are found in use in many industries including those that conduct deep drilling, such as within the oil drilling industry. These cables may be used to transmit information and data from a drilling region having the drilling equipment to a control center located remote to the drilling region. Frequently, the cables have jackets, shells or exterior armor that is used to protect the conductor within the cable. At times, these jackets or shells may need to be removed to gain access to the conductor. Current methods of removing this material includes using a sharp knife or tool to cut through the jacket, or items such as a hot knife or flame source to remove the jacket with ease.

These methods and tools can be hazardous, as workers can become easily cut with the sharp knives and heat sources may be dangerous to use in environments where flammable materials, such as fossil fuels, are present. In addition, many of these conventional tools tend to damage the cable, or the conductor portion interior of the jacket. Damage can also occur to areas of the jacket where removal was not necessary or desired. Damage to the cable, conductor or jacket can result in higher installation and product costs, since a damaged cable may have to be replaced when it is not fully reliable. For example, some cables with damaged jackets may be incapable of sealing properly when they are used in deep drilling operations, and thus, are likely to fail.

Thus, a heretofore unaddressed need exists in the industry to address the aforementioned deficiencies and inadequacies.

SUMMARY OF THE DISCLOSURE

Embodiments of the present disclosure provide a perforation apparatus and related systems and methods thereof. Briefly described, in architecture, one embodiment of the apparatus, among others, can be implemented as follows. A pliers assembly has at least a first jaw member positioned opposing a second jaw member, wherein relative movement of the first and second jaw members is controlled with at least a first handle and a second handle. A first knife edge is on the first jaw member and a second knife edge is on the second jaw member, each of the first and second knife edges are oriented substantially parallel to one another, wherein each of the first and second knife edges are oriented substantially perpendicular to a length of first and second handles, wherein the first and second knife edges are movable towards one another. A spacing device is connected to the pliers assembly, wherein the spacing device controls a closing distance between the first knife edge and the second knife edge.

The present disclosure can also be viewed as providing a perforation system. Briefly described, in architecture, one embodiment of the system, among others, can be implemented as follows. A cable has at least a conductor and a cable jacket positioned radially about the conductor. A perforation apparatus has an elongated handle connected to a movable jaw having at least two jaw tips, wherein a first knife edge is formed on a first of the at least two jaw tips and a second knife edge is formed on a second of the at least two jaw tips, wherein each of the first and second knife edges is oriented substantially parallel to one another, and wherein each of the first and second knife edges are oriented substantially perpendicular to a length of the elongated handle. Two perforations segments are formed within the cable jacket of the cable by the perforation apparatus when the perforation apparatus is placed in contact with the cable jacket and the movable jaw is moved towards a closed position.

The present disclosure can also be viewed as providing methods of creating a perforation within a cable jacket of a cable. In this regard, one embodiment of such a method, among others, can be broadly summarized by the following steps: contacting the cable jacket of the cable with a first jaw member and second jaw member of a perforation apparatus, wherein at least a portion of the cable jacket is positioned between the first and second jaw members; and closing a distance between the first and second jaw members, thereby positioning a first knife edge on the first jaw member and a second knife edge on the second jaw member at least partially within the cable jacket to form at least two perforation segments, wherein each of the first and second knife edges are oriented substantially perpendicular to an elongated length of the perforation apparatus, and wherein each of the first and second knife edges are oriented substantially parallel to an elongated length of the cable.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8 is a flowchart illustrating a method of creating a perforation within a cable jacket of a cable, in accordance with a third exemplary embodiment of the disclosure.

DETAILED DESCRIPTION

Figure 1:
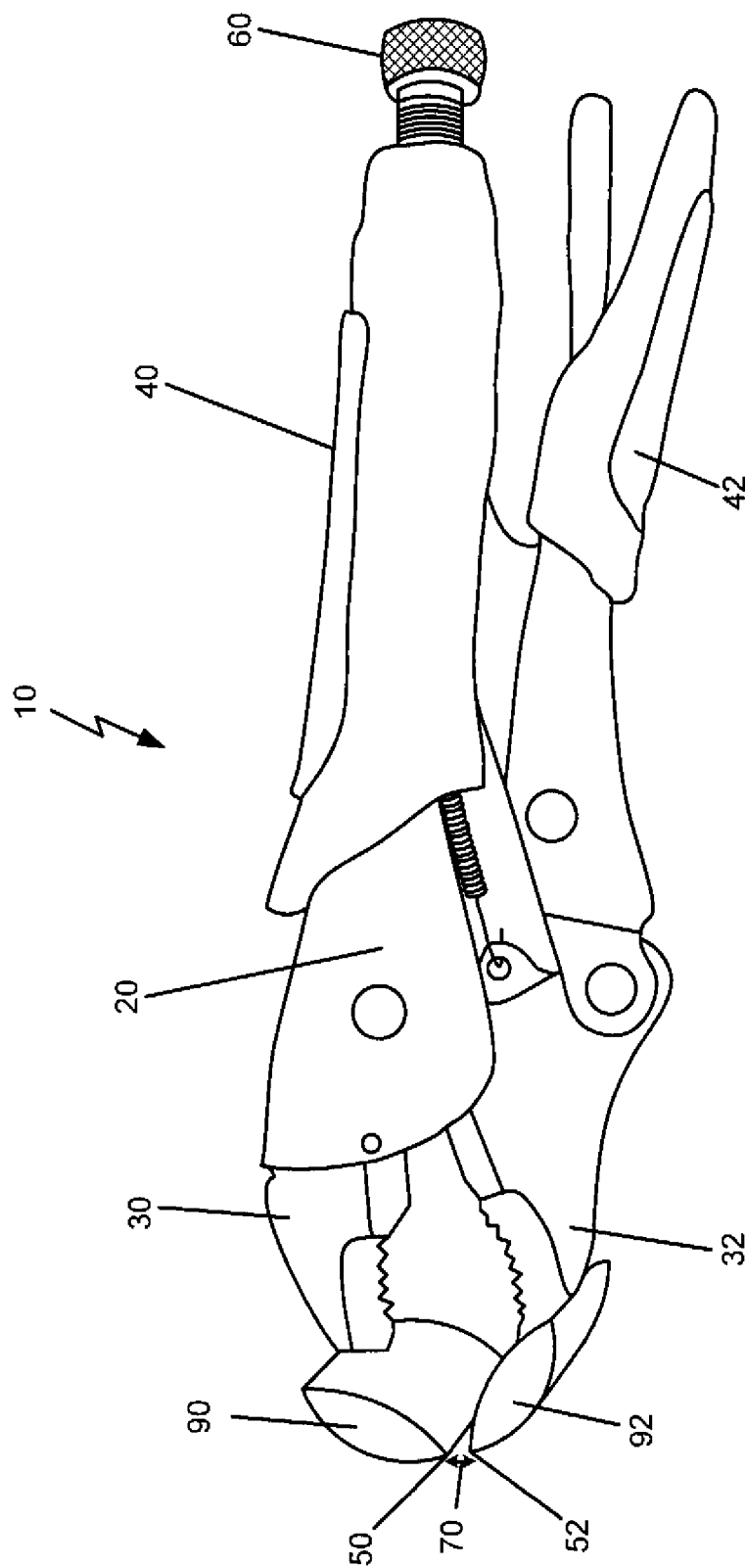
FIG. 1 is a plan view illustration of a perforation apparatus, in accordance with a first exemplary embodiment of the present disclosure.

FIG. 1 is a plan view illustration of a perforation apparatus 10 for use with cable jackets, in accordance with a first exemplary embodiment of the present disclosure. The perforation apparatus for use with cable jackets 10, which may be referred to herein as 'perforation apparatus 10' includes a pliers assembly 20 having at least a first jaw member 30 positioned opposing a second jaw member 32, wherein relative movement of the first and second jaw members 30, 32 is controlled with at least a first handle 40 and a second handle 42. A first knife edge 50 is on the first jaw member 30 and a second knife edge 52 is on the second jaw member 32. Each of the first and second knife edges 50, 52 are oriented substantially parallel to one another, wherein each of the first and second knife edges 50, 52 are oriented substantially perpendicular to a length of first and second handles 40, 42, wherein the first and second knife edges 50, 52 are movable towards one another. A spacing device 60 is connected to the pliers assembly 20, wherein the spacing device 60 controls a closing distance 70 of the first knife edge and the second knife edge 50, 52.

The perforation apparatus 10 may be used to perforate and remove a portion of a cable jacket from a cable. The cable may be any wire, transmission line or similar structure that may be used in a variety of operations, including deep drilling operations, such as with onshore or offshore oil drilling. For example, the cable may be part of a well bore tool which is installed during a completion phase of a well development process. Generally, the cable may include a conductor portion composed of any material, such as copper, aluminum, alloys, fiber electric hybrid materials, fiber optical material or any other material known within the industry, which is capable of facilitating movement of electric charges, light or any other communication medium. The conductor portion may be capable of facilitating movement of energy capable of powering a device or facilitating a communication or control signal between devices. The conductor portion, or a plurality of conductor portions, may be located at substantially the center of the cable, but may also be located off-center or in another position as well.

A jacket may be placed over the conductor portion to insulate it and protect it from an outside environment. This may include an armored jacket or other type of jacket to prevent damage to the cable during use. Armored jackets may be constructed from metals and other protective materials, as is known in the art. In place of the conductor portion, or used in combination thereof, a substantially hollow interior cable portion may also be included in the cable, which may also be referred to as a tube or tubing. This interior cable portion may be used for the transportation of fluids or similar materials, such as for chemical injection or hydraulic control processes. Accordingly, the cable may include any type of cable used with any type of process. The jacket may be constructed from a variety of materials, including plastics, rubbers, and other insulating materials.

Although when the cable is in use the jacket may fully cover the conductor portion, the jacket or a portion of the jacket may need to be removed from time to time to access the conductor portion. To allow for easy and convenient removal of the jacket, the perforation apparatus 10 may be used to create a perforated segment on the jacket, or another similar structure having a lower tear strength than other portions of the jacket which are not contacted by the perforation apparatus 10. The perforation that the perforation apparatus 10 creates may be characterized as a physical attribute given to the cable jacket that allows for removal of all or a portion of the cable jacket with a lower tear strength than removal of the cable jacket without the perforation. For example, this perforation may include a longitudinal line that runs the length of the cable that has a lower tear strength than other portions of the jacket. Of course, other variations on the perforation may be used.

As is shown in FIG. 1, the pliers assembly 20 of the perforation apparatus 10 may include pliers that are known in the art, such as pliers commonly called locking pliers. The pliers assembly 20 includes the first and second handles 40, 42 which can be gripped by a user. Each of the first and second handles 40, 42 are connected, either integrally or with one or more fasteners, to the first and second jaw members 30, 32, respectively. For example, the first and second handles 40, 42 may be connected together on at least one pivot point, whereby movement of the first and/or second handles 40, 42 translates into movement of the first or second jaw members 30, 32, as is well known within the art.

The first and second jaw members 30, 32 include first and second jaw tips 90, 92 which are positioned at a distal end of the first and second jaw members 30, 32, respectively. The first and second knife edges 50, 52 may be positioned on either the first and second jaw members 30, 32 or the first and second jaw tips 90, 92. The first and second jaw tips 90, 92 may be provided for proper positioning of the first and second knife edges 50, 52, especially with a pliers assembly 20 that includes a conventionally-known jaw configuration. One or either of the first and second jaw tips 90, 92 may be oriented angularly with respect to the length of first and second handles 40, 42 to position the first and second knife edges 50, 52 at any angle with respect to the closing motion of the first and second jaw members 30, 32.

The first and second jaw tips 90, 92 may have a variety of shapes and sizes. For example, the first and second jaw tips 90, 92 may include a substantially pointed oval shape having two pointed edges, as is shown clearly in FIGS. 1 and 2. The substantially pointed oval shape may have a curved outer surface that tapers at each end to pointed edges. At least one of the two pointed edges may be positioned at a first end of the pointed oval shape, i.e., on one side of the pointed oval shape, and the other pointed edge may be positioned at a second end of the pointed oval shape, i.e., the other side of the pointed oval shape that is opposite the first side. One of the two pointed edges may form one of the first and second knife edges 50, 52 for the first and second jaw member 30, 32.

The first and second knife edges 50, 52 may be integrally formed with the first and second jaw tips 90, 92, or connected thereto by any other means. The first and second knife edges 50, 52 each form a pointed edge that faces towards the pointed edge of the other. The distance between the first and second knife edges 50, 52 is the closing distance 70, which may be the distance between the two surfaces at any given point of time. The closing distance 70 may be controlled by a spacing device 60, which may be manipulated to create a specific or intended closing distance 70. In FIG. 1, the spacing device 60 is illustrated as a threaded bolt that adjusts the distance between the first handle 40 and the second handle 42 with a connecting structure. This orients the first and second jaw members 30, 32 to be positioned a predetermined distance from one another. For example, when the spacing device 60 is in one position, the first and second jaw members 30, 32 may be capable of closing fully, i.e., where the first jaw member 30 contacts the second jaw member 32. In another position of the spacing device 60, the first and second jaw members 30, 32 may be prevented from contacting.

Figure 2:
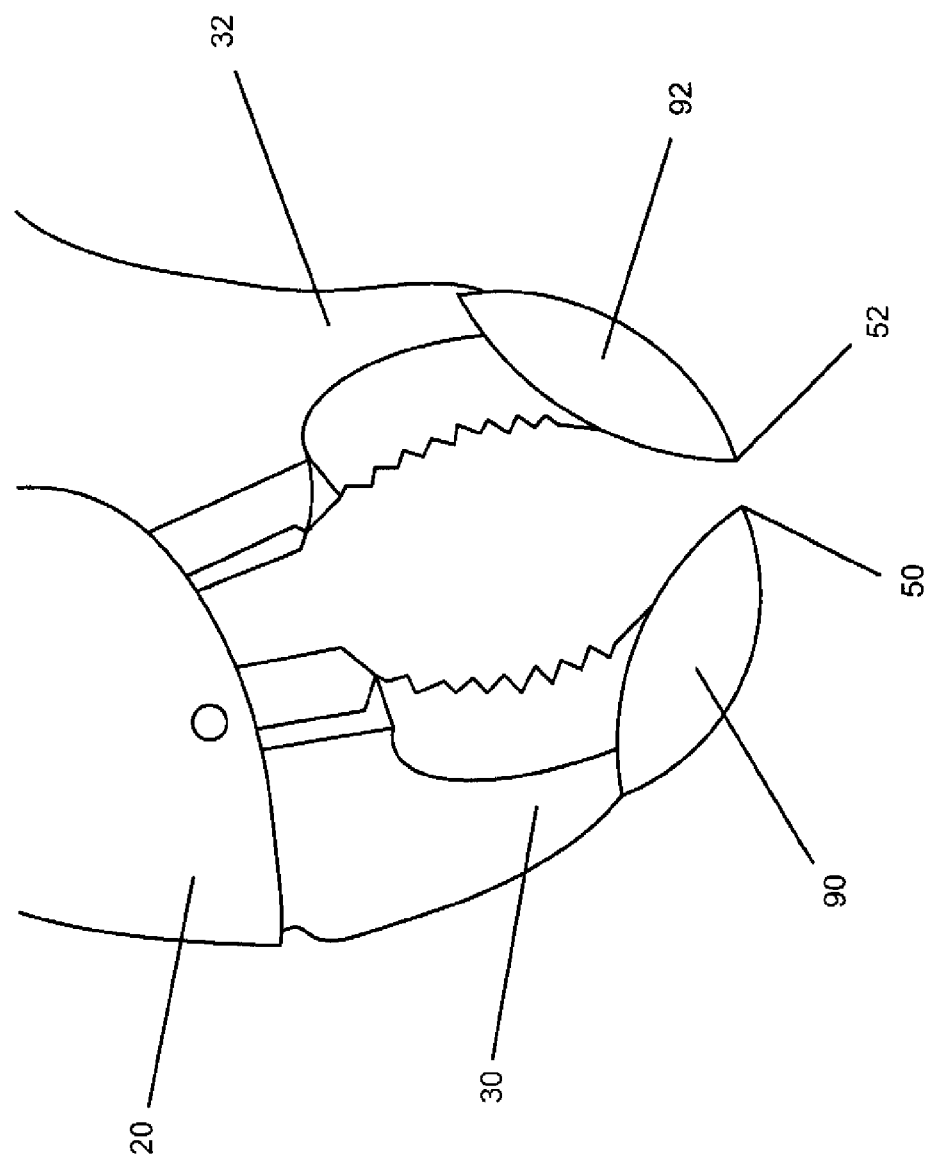
FIG. 2 is a side-view illustration of the first and second jaw members of the perforation apparatus, in accordance with the first exemplary embodiment of the present disclosure.

FIG. 2 is a top-view illustration of the first and second jaw members 30, 32 of the perforation apparatus 10, in accordance with the first exemplary embodiment of the present disclosure. As can be seen, the first and second knife edges 50, 52 are positioned on the ends of the first and second jaw tips 90, 92, which are integrally formed with the first and second jaw members 30, 32, respectively. These first and second knife edges 50, 52 may be used to perforate, cut, or partially cut through the cable jacket of a cable. The first and second knife edges 50, 52 may have a variety of different angles, thereby allowing for various different perforations of cuts to be made in the cable jacket. For example, as is shown in FIG. 2, the first and second jaw tips 90, 92 may have a rounded exterior surface and a plurality of substantially straight interior surfaces angularly disposed to one another. At the inner terminating end of the first and second jaw tips 90, 92, the first and second knife edges 50, 52 are formed. The first knife edge 50 may have a varying shape, size or configuration than the second knife edge 52, as may be required by design. Any other type of configuration of the first and second jaw tips 90, 92 and the first and second knife edges 50, 52 may be used, depending on the design of the perforation apparatus 10, all of which are considered within the scope of the present disclosure.

As can be seen in both FIGS. 1 and 2, the first and second knife edges 50, 52 are oriented perpendicular or substantially perpendicular from the elongated length of the perforation apparatus 10 and the first and second handles 40, 42. In other words, the perforation that the first and second knife edges 50, 52 create on the jacket of the cable will be substantially perpendicular to the orientation of the perforation apparatus 10 itself when the perforation is being formed. As one having skill in the art will recognize, conventional cable jacket cutting or perforating tools all have cutting edges that are oriented in-line or parallel with the elongated length of the cutting tool. However, this orientation prevents these conventional tools from being able to create a proper cut or perforation along the length of the cable jacket. The perforation apparatus 10, however, can be used along any portion of the cable jacket to easily create a perforation or cut, such that a section of the cable jacket can be removed.

Figure 3:
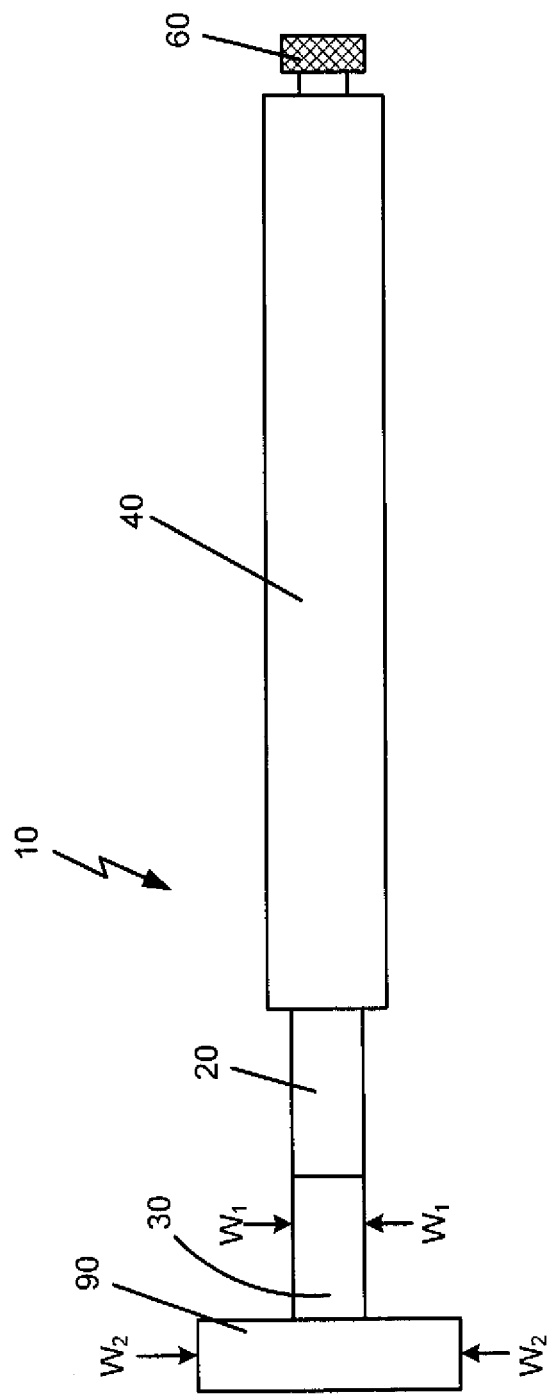
FIG. 3 is a top-view illustration of the perforation apparatus, in accordance with the first exemplary embodiment of the present disclosure.

FIG. 3 is a top-view illustration of the perforation apparatus 10, in accordance with the first exemplary embodiment of the present disclosure. The first and second jaw tips 90, 92 (shown in FIGS. 1-2 as well), may each be positioned to have a width dimension that is larger than a width dimension of the first and second jaw members 30, 32 (shown in FIG. 1-2). As is shown in FIG. 3, arrows $W_1$ indicate the width of the first jaw member 30 while arrows $W_2$ indicate the width of the first jaw tip 90. $W_1$ may be slightly or substantially larger than $W_2$, depending on the design of the perforation apparatus 10. A jaw tip with a larger width dimension may provide for more efficient perforation forming within a cable jacket, since each compression of the cable jacket by the perforation apparatus 10 will result in a larger contact surface between the knife edges on the jaw tips to the cable jacket.

Figure 4:
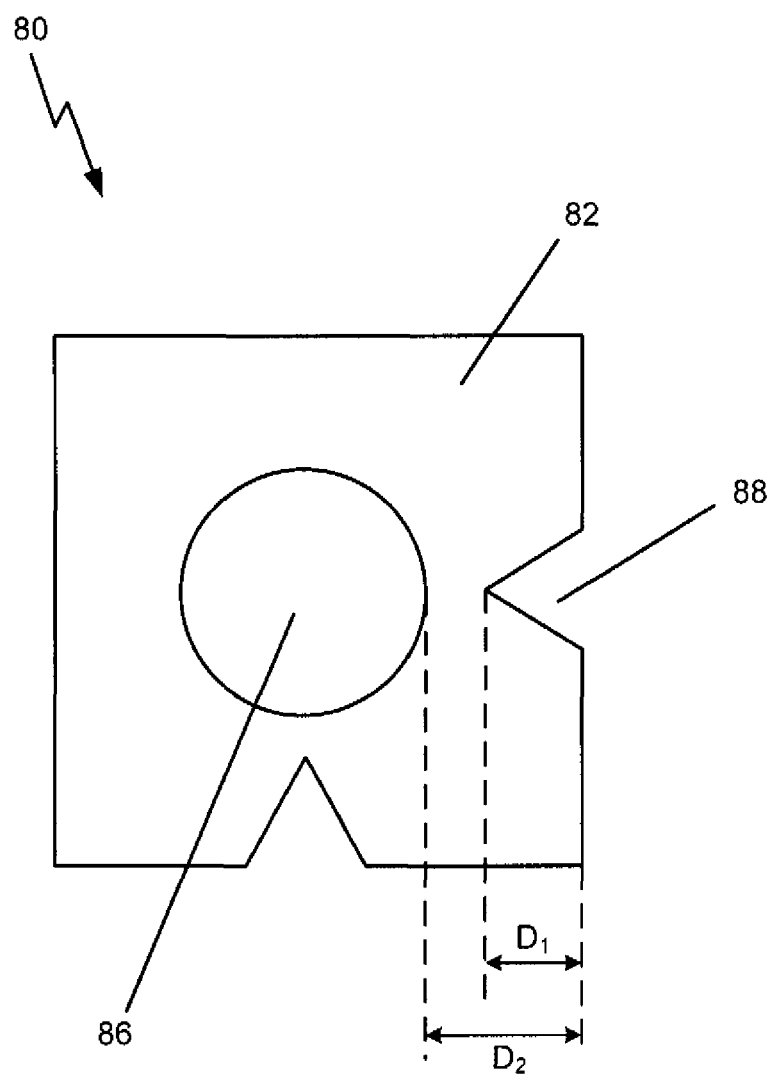
FIG. 4 is a cross-sectional view of a cable used with the perforation apparatus, in accordance with the first exemplary embodiment of the present disclosure.

FIG. 4 is a cross-sectional view of a cable 80 used with the perforation apparatus (not shown), in accordance with the first exemplary embodiment of the present disclosure. The cable 80 may include a conductor or conducting portion 86, which may be capable of conducting, transporting, or otherwise moving any type of energy, material, or substance. The conducting portion 86 may be radially surrounded with a cable jacket 82. The perforation apparatus may be used to create perforation segments 88 within the cable jacket 82. The depth and shape of the perforation segments 88 within the cable jacket 82 may be dependent on the size of the perforation apparatus 10, namely the size of the jaw tips and jaw members, as well as dependent on the sharpness of the knife edges, and the force that the jaw members are closed with. Further, the closing distance between the first and second knife edges 50, 52 may correspond to a depth of the perforation segment 88 within the cable jacket.

While the depth, size, and shape of the perforation segment 88 may vary, it may be preferable for the perforation segment to be formed a particular distance through the cable jacket 82. For example, in FIG. 4, the depth of the perforation segment 88 may be expressed by $D_1$, whereas the overall thickness of the cable jacket 82 may be $D_2$. It may be preferable for the depth of the perforation segment 88, $D_1$, to be a least 50% of the thickness of the cable jacket, $D_2$, or at least 75% of the thickness of the cable jacket, $D_2$. However, other thickness of the depth of the perforation segment 88 may be desirable depending on other factors and characteristics of the perforation apparatus 10 and/or the cable 80.

Figure 5:
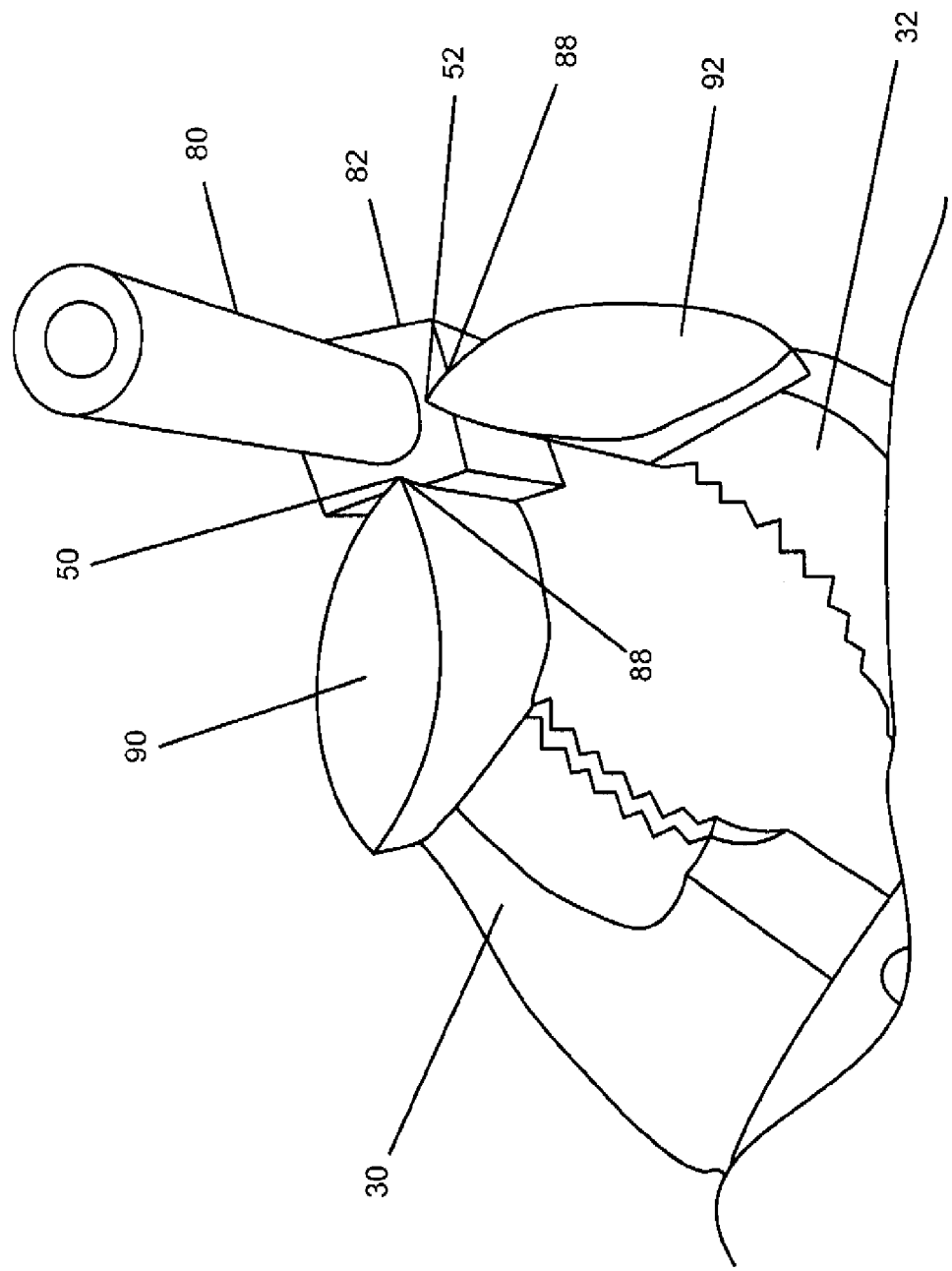
FIG. 5 is a plan view illustration of the first and second jaw members of the perforation apparatus in use with a cable and jacket, in accordance with the first exemplary embodiment of the present disclosure.
Figure 6:
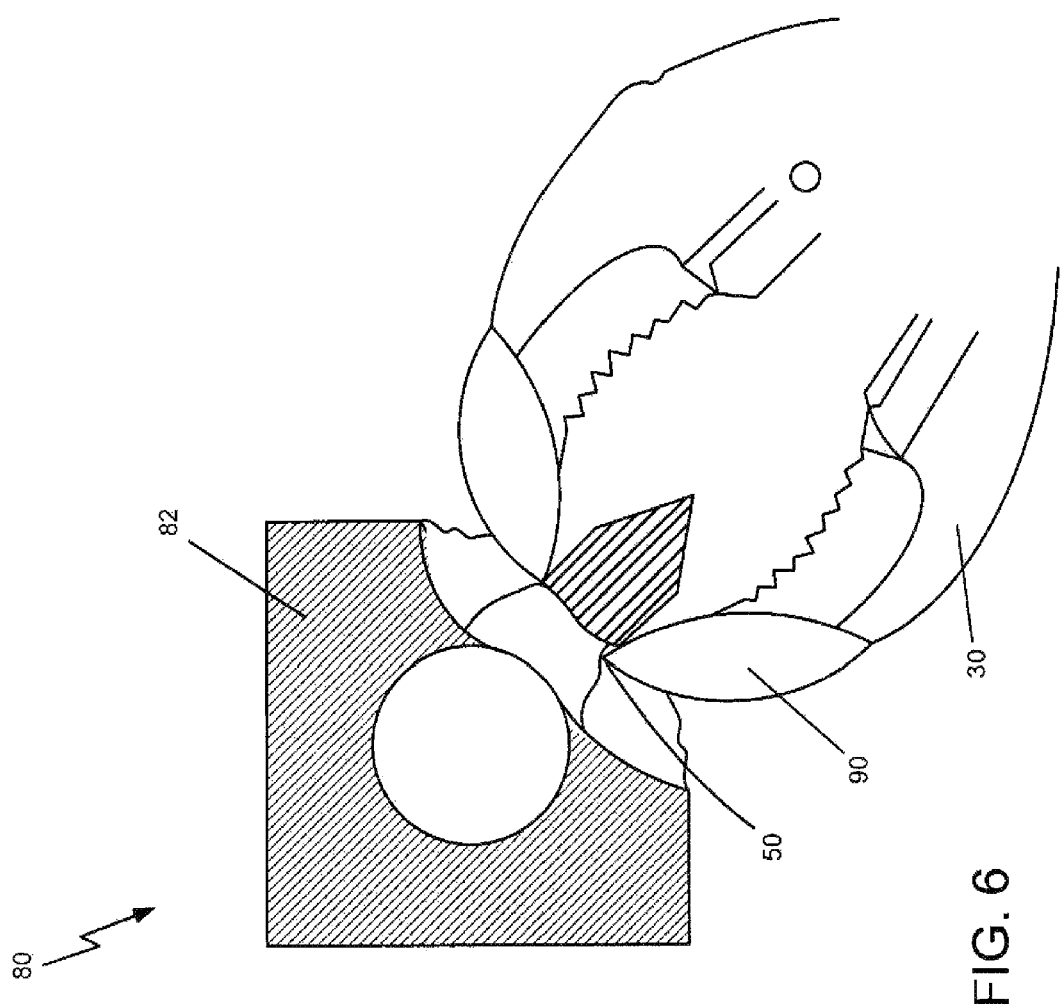
FIG. 6 is a plan view illustration of the first and second jaw members of the perforation apparatus in use with a cable and jacket, in accordance with the first exemplary embodiment of the present disclosure.

FIG. 5 is a plan view illustration of the first and second jaw members 30, 32 of the perforation apparatus 10 in use with a cable 80 and jacket 82, in accordance with the first exemplary embodiment of the present disclosure. FIG. 6 is a plan view illustration of the first and second jaw members 30, 32 of the perforation apparatus 10 in use with a cable 80 and jacket 82, in accordance with the first exemplary embodiment of the present disclosure. As is shown, the first and second knife edges 50, 52 formed on the first and second jaw tips 90, 92 are engaged with a jacket 82 of the cable 80, where the first and second knife edges 50, 52 are forming perforation segments 88 within the jacket 82. This perforation segment 88 within the jacket 82 allows the entire jacket 82, or just a portion thereof, to be easily removed. For example, in FIG. 5 the portion of the jacket between the first and second knife edges 50, 52 may be easily removed after the perforation segments 88 are created. As is shown in FIG. 6, once the perforation segments 88 are created, the perforation apparatus 10 itself may be used to remove this portion of the jacket 82. For example, removal of the portion of the jacket 82 may be accomplished by retaining the portion of the jacket 82 between the first and second jaw tips 90, 92 and forcing the perforation apparatus 10 away from the cable.

The spacing device 60 (FIG. 1) may be used to control the closing distance 70 (FIGS. 1-2) of the first and second knife edges 50, 52. For example, the spacing device 60 may be set such that the first and second knife edges 50, 52 have a closing distance 70 that is relative to a size of the cable or conductor within the cable 80. This may include the diameter of the cable 80 or conducting portion, or the distance of a segment line or ray that is connected between two points on the surface of the cable or conducting portion. By setting the closing distance 70 to the desired amount, the perforation apparatus 10 may easily perforate the jacket 82 without damaging the conducting portion, or any other part of the cable 80, such as any other materials interior of the jacket.

The use of the perforation apparatus 10 may allow for safer, more convenient removal of the jacket 82 of the cable 80, since the perforation apparatus 10 can remove the jacket 82 without many of the safety issues that conventional tools and methods included. Additionally, the perforation apparatus 10 will allow for faster removal of the jacket 82, as well as enable inexperienced workers to remove the jacket 82 of the cable 80 easier than with conventional tools. The perforation apparatus 10 may be used in varying ways, including with multiple cables 80 at once when the tool includes multiple knife edges. Furthermore, cables 80 may be manufactured to allow for use of the perforation apparatus 10, such as by extruding a press or indentation in the length of the cable jacket 82, or periodically every few feet along the length, which may allow for removal of fixed sections of the jacket 82, as is discussed relative to FIG. 7.

Figure 7:
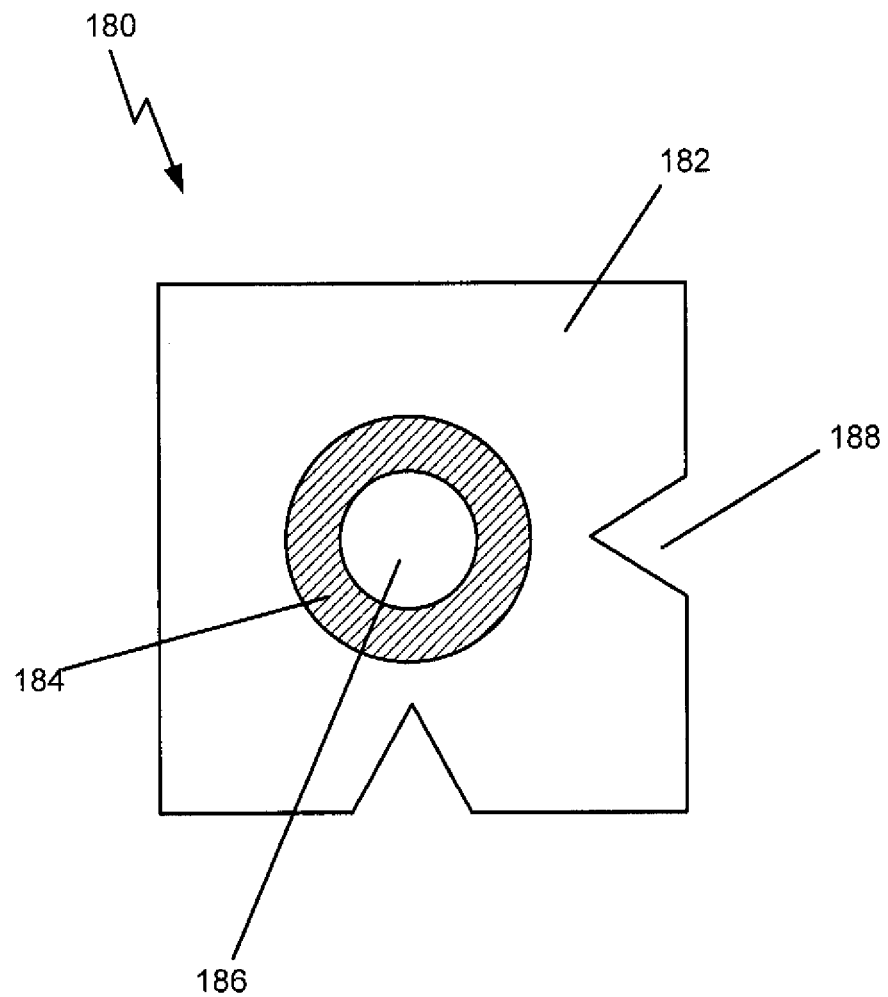
FIG. 7 is a cross-sectional view illustration of a cable having a cable jacket, in accordance with a second exemplary embodiment of the present disclosure.

FIG. 7 is a cross-sectional view illustration of a cable 180 having a cable jacket 182, in accordance with a second exemplary embodiment of the present disclosure. The cable 180 with cable jacket 182 may be used with the perforation apparatus 10 discussed with respect to FIGS. 1-6. The cable 180 may include any type of cable device, and may further include an exterior cable portion 184 and an interior cable portion 186. The exterior cable portion 184 may be a hard or rigid material, such as a metal whereas the interior cable portion 186 may include a conductor or other signal transmission device, or be substantially hollow such that it can transport a quantity of fluid. For example, the cable 180 may be capable of transmitting electrical or communication signals when the interior cable portion 186 includes a conducting material or the cable may have a hollow interior cable portion 186 that allows fluid material to be transported. For example, the cable 180 having a hollow interior cable portion 186 may be referred to as 'empty tubing' and used for chemical injection, hydraulic control, etc.

The cable jacket 182 may be extruded on the cable 180 with a predefined shape, as is shown in FIG. 7. Specifically, the extrusion of the cable jacket 182 may form at least one, but commonly two perforated segments or tear-away sections 188, which may have a lesser thickness than other portions of the cable jacket 182. The tear-away sections 188 may be engaged by the perforation apparatus 10 of the first exemplary embodiment, which may penetrate through the remaining material between the cable 180 and the tear-away section 188, thereby allowing one portion of the cable jacket 182, i.e., the portion between the two tear-away sections 188, to be removed from the cable 180. This allows for removal of the entire cable jacket 182, or just a portion of the cable jacket 182 while leaving the remaining parts of the cable jacket 182 intact. Additionally, this removal of the cable jacket 182 or portion of the cable jacket 182 may be done without a knife, thereby freeing personnel of numerous safety hazards and minimizing damage to the cable which can affect sealing. Likewise, no cord to remove the cable jacket 182 is needed, which is beneficial since cords often require additional time for removal, can create a leak path in the cable jacket 182, and/or can still require additional tools to get the cable jacket 182 off.

FIG. 8 is a flowchart 200 illustrating a method of creating a perforation within a cable jacket of a cable, in accordance with a third exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, the cable jacket of the cable is contacted with a first jaw member and second jaw member of a perforation apparatus, wherein at least a portion of the cable jacket is positioned between the first and second jaw members. A distance between the first and second jaw members is closed, thereby positioning a first knife edge on the first jaw member and a second knife edge on the second jaw member at least partially within the cable jacket to form at least two perforation segments, wherein each of the first and second knife edges are oriented substantially perpendicular to an elongated length of the perforation apparatus, and wherein each of the first and second knife edges are oriented substantially parallel to an elongated length of the cable (block 204).

The method may also include any number of additional steps, functions, structures, or variations thereof, including any of the functions disclosed with respect to any embodiment of this disclosure. For example, the closing distance between the first and second jaw members may be controlled with a spacing device connected to the perforation apparatus. A predetermined closing distance may be selected by configuring the spacing device. When closing the jaw members, the cable jacket may be pierced with the first knife edge and the second knife edge to form the perforation segments. The perforation segments are formed through at least 50% of a thickness of the cable jacket, at least 75% of the thickness of the cable jacket, or through any other thickness of the cable jacket. The perforation apparatus may be pulled away from the cable jacket after closing the distance between the first and second jaw members and without opening the first and second jaw members, wherein a portion of the cable jacket formed between the at least two perforation segments is removed from the cable.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A perforation system comprising:
   a cable having at least a conductor and a cable jacket positioned radially about the conductor, wherein the cable jacket includes two perforation segments formed therein, the two perforation segments extending along a length of the cable and being offset from one another by 90° about a perimeter of the cable jacket; and a perforation apparatus having an elongated handle including a first handle member connected to a first jaw member and a second handle member connected to a second jaw member, wherein the first jaw member is movable relative to the second jaw member, wherein the first and second jaw members include first and second jaw tips, respectively, wherein the first jaw member is angularly oriented relative to the second jaw member, and wherein at least one of the first jaw tip and the second jaw tip is of a cylinder geometry having end faces of biconvex geometry consisting of two arcs joined to each other at both a first endpoint and a second endpoint; and a first knife edge formed on the first jaw tip and a second knife edge formed on the second jaw tip, wherein each of the first and second knife edges is oriented substantially parallel to one another and substantially perpendicular to a length of the elongated handle;

wherein to remove a portion of the cable jacket between the two perforation segments, the perforation apparatus is configured such that the first jaw tip is positionable within one of the two perforation segments and the second jaw tip is positionable within the other of the two perforation segments.

2. The perforation system of claim 1, further comprising a spacing device connected to the perforation apparatus, wherein the spacing device controls a closing distance between the first knife edge and the second knife edge when the first and second jaw members are moved towards a closed position.

3. The perforation system of claim 2, wherein the closing distance between the first and second knife edges corresponds to a predetermined perforation segment depth within the cable jacket.

4. The perforation system of claim 1, wherein the two perforation segments are formed through at least 50% of a thickness of the cable jacket.

5. The perforation system of claim 1, wherein the two perforation segments are formed through at least 75% of the thickness of the cable jacket.

6. The perforation system of claim 2, wherein the closing distance is a predetermined distance determined by a configuration of the spacing device.

7. The perforation system of claim 2, wherein the spacing device further comprises a threaded tensioner.

8. The perforation system of claim 1, wherein each of the first and second jaw tips are positioned at a distal end of the first and second jaw members, respectively.

9. The perforation system of claim 1, wherein at least one of the first and second jaw tips is oriented angularly with respect to the length of the elongated handle.

10. The perforation system of claim 1, wherein the first and second knife edges each have a length dimension that is larger than a width dimension of the first and second jaw members, respectively, wherein the length dimension of the first and second knife edges and the width dimension of the first and second jaw members are measured perpendicular to the length of the elongated handle.

11. The perforation system of claim 1, wherein the first jaw tip conforms to one of the two perforation segments and the second jaw tip conforms to the other of the two perforation segments.

12. The perforation system of claim 1, wherein the perforation apparatus is configured to grip the cable jacket of the cable.

13. The perforation system of claim 1, wherein the cylinder geometry is that of a right cylinder.

* * * * *